United States Patent
Talluri et al.

[19]

[11] Patent Number: 6,111,916
[45] Date of Patent: Aug. 29, 2000

[54] ERROR RESILIENT ENCODING

[75] Inventors: Rajendra K. Talluri, Plano, Tex.; Gene Cheung, Berkeley, Calif.

[73] Assignee: Texas Instruments Incorporated, Dallas, Tex.

[21] Appl. No.: 09/019,787

[22] Filed: Feb. 6, 1998

Related U.S. Application Data

[60] Provisional application No. 60/037,729, Feb. 7, 1997.

[51] Int. Cl.[7] .................................. H04N 7/12; H04N 5/08
[52] U.S. Cl. .................. 375/240; 348/845.1; 348/845.3; 348/533
[58] Field of Search ................................. 348/845, 845.1, 348/845.2, 845.3, 500, 521, 525, 533; 375/240

[56] References Cited

U.S. PATENT DOCUMENTS

| | | | |
|---|---|---|---|
| 5,715,005 | 2/1998 | Masaki | 348/416 |
| 5,793,895 | 8/1998 | Chang et al. | 382/236 |
| 5,801,779 | 9/1998 | Uz et al. | 348/420 |
| 5,844,628 | 12/1998 | Hamano et al. | 348/616 |
| 5,896,176 | 4/1999 | Das et al. | 348/416 |

FOREIGN PATENT DOCUMENTS

0861001A2  8/1998  European Pat. Off. ......... H04N 7/26

*Primary Examiner*—Vu Le
*Attorney, Agent, or Firm*—Carlton H. Hoel; W. James Brady; Frederick J. Telecky, Jr.

[57] ABSTRACT

Video compressed by (macro)block level motion compensation has bitstream with the motion vectors aggregated and separated form the corresponding texture data by a resynchronization word, and a method of generating resynchronization words from variable length code tables which encode the motion vectors or the texture data adjacent to a resynchronization word.

1 Claim, 3 Drawing Sheets

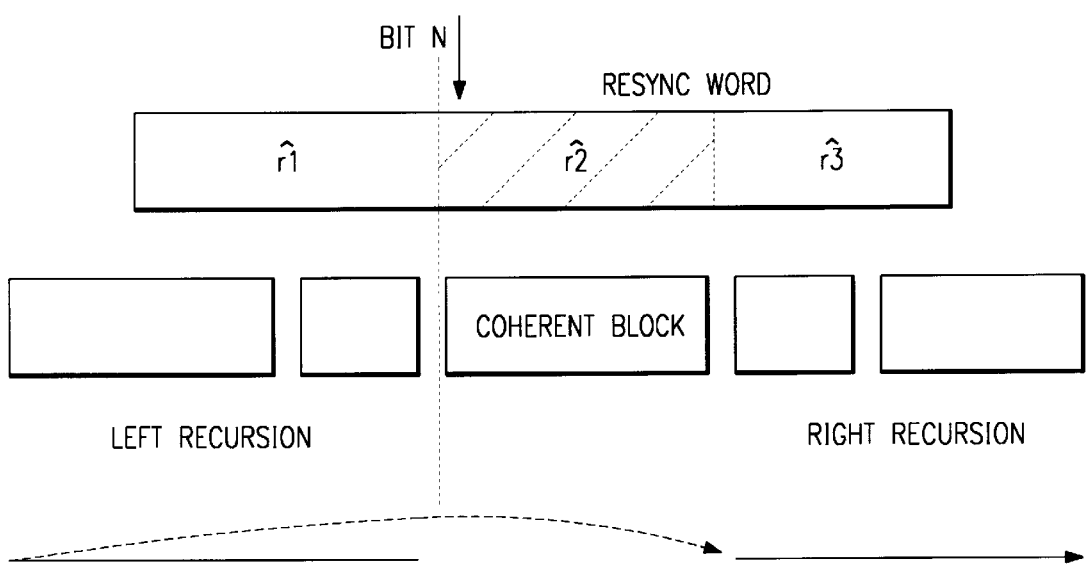

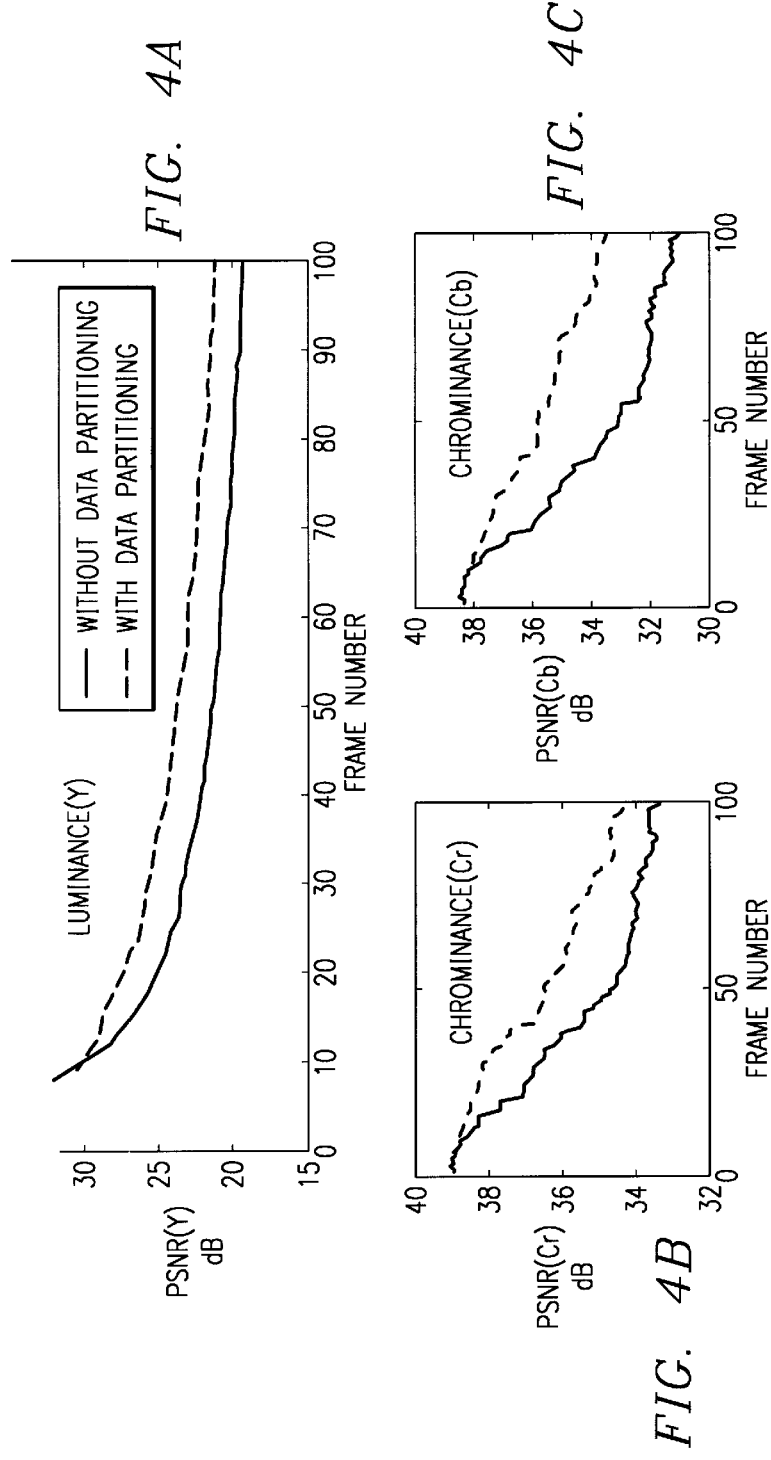

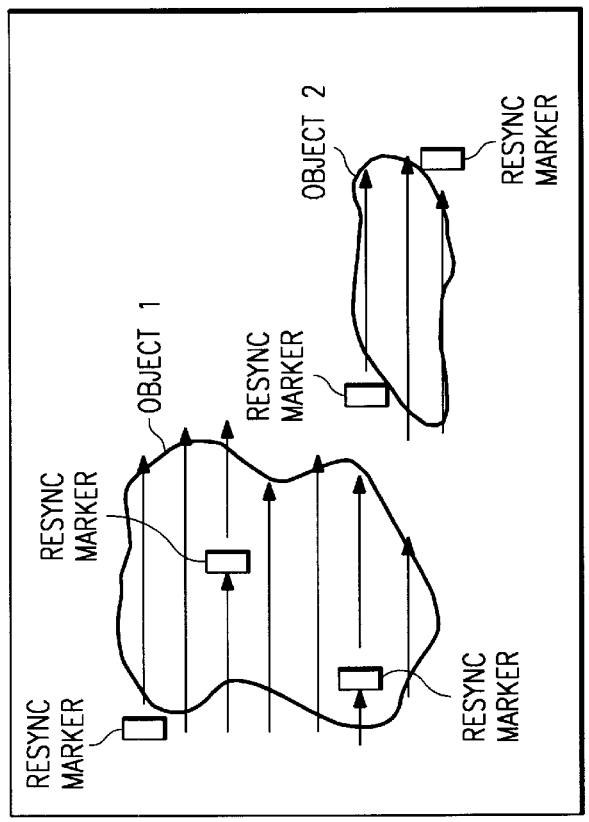

ERROR RESILIENT ENCODING

This application claims priority under 35 USC § 119(e)(1) of provisional application No. 60/037,729 filed Feb. 7, 1997.

CROSS-REFERENCE TO RELATED APPLICATIONS

This application is related to patent application Ser. No. 08/739,111, filed Oct. 25, 1996.

BACKGROUND

The present application relates to information encoding for transmission over noisy channels and storage, and more particularly to error resilient encoding.

Two common approaches to the mitigation of errors arising during the transmission of data over noisy channels exist: Automatic Retransmission Request (ARQ) and Forward Error Correction (FEC). ARQ type of mitigation typically would not be feasible in multicast or real-time applications such as video because of intolerable time delays or a lack of feedback channel. In such cases, a decoder can only decode the error corrupted bitstream, protected to an extent by error correction encoding, and must create from such bitstream. FEC provides mitigation by error correcting codes (e.g., Reed-Solomon). However, uncorrectable errors require further mitigated approaches.

In general, commonly used video compression methods have block-based motion compensation to remove temporal redundancy. Motion compensation methods encode only (macro)block motion vectors and the corresponding quantized residuals (texture); and variable length coding (VLC) of the motion vectors and residual increases coding efficiency. However, variable length coding often are highly susceptible to transmission channel errors and a decoder easily loses synchronization with the encoder when uncorrectable errors arise. The predictive coding methods, such as motion compensation, make matters much worse because the errors in one video frame quickly propagate across the entire video sequence and rapidly degrade the decoded video quality.

The typical approach of such block-based video compression methods to uncorrectable errors includes the steps of error detection (e.g., out-of-range motion vectors, invalid VLC table entry, or invalid number of residuals in a block), resynchronization of the decoder with the encoder, and error concealment by repetition of previously transmitted correct data in place of the uncorrectable data. For example, video compressed using MPEG1-2 has a resynchronization marker (start code) at the start of each slice of macroblocks (MBs) of a frame, and an uncorrectable error results in all of the data between correctly decoded resynchronization markers being discarded. This implies degradation in quality of the video stream, especially for predictive compression methods such as MPEG.

These video compression and decompression methods may be implemented on special integrated circuits or on programmable digital signal processors or microprocessors.

SUMMARY OF THE INVENTION

The present invention provides resynchronization imbedded within a video bitstream by partitioning of motion vector data and corresponding texture data so that with some uncorrectable errors the motion vector data may still be usable. The present invention also provides a method of selecting a word to use as a resynchronization marker compatible with variable length codes of the data.

This provides advantages including partial recovery over uncorrectable error in a packet of compressed video data with little additional overhead.

BRIEF DESCRIPTION OF THE DRAWINGS

The drawings are schematic for clarity.

FIG. 1 illustrates a bitstream packet syntax with first preferred embodiment resynchronization.

FIG. 2 shows known bitstream packet syntax with resynchronization.

FIG. 3 shows a resynchronization word search.

FIG. 4 shows experimental results.

FIG. 5 shows another bitstream syntax.

FIG. 6 shows object scan.

FIG. 7 shows another bitstream syntax.

DETAILED DESCRIPTION OF THE PREFERRED EMBODIMENTS

Bitstream Syntax

FIG. 1 illustrates a first preferred embodiment bitstream packet syntax with motion resynchronization, and, for comparison, FIG. 2 shows a known packet syntax without the preferred embodiment motion resynchronization. In particular, both FIGS. 1 and 2 show a packet syntax for MPEG type encoded video which partitions a frame into blocks or macroblocks (MBs) and encodes most MBs by motion vectors (MV) for prediction from prior MBs plus texture data (DCT) for the (compressed) difference between predicted and actual MB pixels. Indeed, a (luminance only) frame of 288 lines with 352 pixels per line forms an 18 by 22 array of MBs with each MB a 16 by 16 array of pixels. For transmission or storage the sequence of 396 MBs of such a frame would be split into packets of convenient size. For example, with a packet size of about 1000 bytes and with an average MB encoded by about 320 bits (e.g., 20 bits for motion vector(s) and 300 bits for texture), then a packet would contain roughly 25 MBs. Consequently, such a frame would require roughly 16 packets for transmission, and a frame rate of 30 frames per second would require roughly 3.8 Mbps transmission. For low bit rate transmission, the texture data is greatly decreased, so the motion vector data becomes relatively more important.

Typically, the MBs of a frame are grouped into slices with a slice consisting of one or more consecutive MBs in a single row of a frame. Thus in the foregoing example, a slice could include from 1 to 22 MBs. Within a slice the macroblock data appears sequentially. Resynchronization may be performed using the slice start codes. For example, a simplified slice heuristically could be:

```
slice()
{       slice_start_code
        macroblock_number
        quantizer_scale_code
        do {
                macroblock(i)
        } while (j < macroblock_count)
        next_start_code()
}
``` where the macroblock() function provides motion vector(s) and texture data for a macroblock and macroblock_number is the number in a frame scan of the first macroblock in the slice. This provides the syntax illustrated in FIG. 2 with motion vector and texture data interleaved on a macroblock basis.

In contrast, a preferred embodiment slice function partitions motion vector data and texture data into separate parts plus inserts a motion resynchronization word (motion_resynch) between these data parts heuristically as follow:

```
slice()
{       slice_start_code
        macroblock_number
        quantizer_scale_code
        do {
                motion_vector(j)
        } while (j < macroblock_count)
        motion_resynch
        do {
                block(j)
        } while (j < macroblock_count)
        next_start_code()
}
``` where the motion_vector() and block functions provide the motion vector(s) and texture data for a macroblock. The motion_resynch word provides additional error concealment as follows.

The motion_resynch word is computed from the motion vector VLC tables to be a Hamming distance of at least 1 from any allowed sequence of motion vector data. The motion_resynch word is uniquely decodable from the motion vector VLC codeword stream and gives the decoder knowledge of where to stop reading motion vector data before beginning to read texture data. The number of macroblocks in the packet is implicitly known after the decoder encounters the motion_resynch word. In response to an error detection the decoder proceeds depending upon the error type.

(1) When an uncorrectable error is detected in the motion vector data, the decoder flags an error and replaces all of the macroblocks in the packet with skipped blocks until the next resynchronization marker. Resynchronization occurs at the next successfully read resynchronization marker. If any subsequent video packets are lost before resynchronization, those packets are replace by skipped macroblocks.

In an alternate scheme, when the decoder detects an error in the motion vector data, it may also choose to utilize the part of the motion vector data that was decoded correctly (say "N" macroblocks) and apply motion compensation. The decoder then seeks the motion marker and tries to decode the corresponding "N" macroblocks of texture data. If this texture data is decodable without any detectable errors, the decoder adds this texture data to the already motion compensated "N" blocks. If an error is detected in decoding any of the "N" macroblocks texture, the decoder only uses the motion compensation and replaces the texture data with zeros.

(2) When an error is detected in the texture data (after encountering the motion_resynch word and and no error had been detected in the motion data) the motion vector data is used to perform the motion compensation. The texture data of the macroblocks is all replaced with zero and the decoder resynchronizes to the next resynchronization marker.

(3) If no error is detected either in the motion vector or the texture data but the resynchronization marker I not found at the end of decoding all of the macroblocks of the packet, an error is flagged and only the texture data of the packet is discarded. Motion compensation is still applied for the macroblocks as there is a higher confidence in the motion vector data because it came prior to the detected motion_resynch word.

(4) If no errors are detected in the motion vector data or texture data in the current packet and the next resynchronization marker is found, then an additional check may be employed: the number of the first macroblock of the next packet minus the number of the first macroblock of the current packet should equal the number of macroblocks in the current packet as found by the decoding of the motion vector data up to the motion_resynch word. If these two measures of the number of macroblocks do not agree, then discard the data of this next packet because there is a high probability of an error in the number of the first macroblock of this next packet. The chance of an error in the current packet is small since the number of motion vectors correctly decoded agreed with the number of texture data items correctly decoded and the motion_resynch word was found in the correct place. This is in contrast to the FIG. 2 type syntax where such and error requires both packets be discarded because the location of the error occurrence and the location of the error detection usually do not coincide and neither packet can be relied on.

In short, the motion_resynch word provides (1) more stringent checks on the validity of the motion vector data because the motion_resynch word must be found at the end of the motion vector data and (2) an undetected error in the motion vector and texture data coupled with not finding the next resynchronization marker only requires discarding the texture data because the motion_resynch word was correctly found.

The motion resynchronization word may be computed from the motion VLC tables using a search as described in the following section; the word is a Hamming distance at least 1 from any possible valid combination from the motion VLC tables.

Resynchronization Word Generation

The first preferred embodiment method creates resynchronization words (the motion resynchronization word of the preceding section would be an example) by a search based on the corresponding VLC tables. An optimal resynchronization word can be selected from the possible words found by the search. In particular, presume that a bitstream has a sequence of codewords, $c_i^k$ (ith codeword from kth VLC table), the preferred embodiment method finds a word which differs from all possible bit patterns arising in this bitstream. A natural metric for comparison of performance of potential words is the Hamming distance between the word and the set of all possible patterns in bitstreams derivable from the VLC tables: a positive Hamming distance implies a word differing from all bit patterns in the bitstream. Thus for a given word length, R, the idea is to find among the $2^R$ words of length R the word(s) with the maximal Hamming distance from all possible bit patterns of length R which could arise in bitstreams derived from the VLC tables. Of course, if all words of length R have a Hanning distance 0 from the bit patterns, then R must be increased.

To find the Hamming distance between potential resynchronization words of length R and bitstream bit patterns of length R, divide the set of bit patterns into three subspaces for searching: subspace $S_1$ of codewords of length at least R, subspace $S_2$ of allowable concatenated ordered pairs of codewords with a sum of lengths at least R, and subspace $S_3$ of allowable concatenations of at least three codewords with each of the imbedded (interior) codewords of the concatenation having a length less than R, The search with a potential resynchronization word r proceeds as follows.

First search over subspace $S_1$:

(1) Initialize a variable H to be L(r) where L() is the length of (number bits in) its argument; H will be the Hamming distance of r to the subspace $S_1$ at the end of the first search.

(2) The total number of shifts needed to find the Hamming distance between word r and codeword $c_i^k$ in $S_1$ is $L(c_i^k)-L(r)+1$, so initialize a shift counter $N=L(c_i^k)-L(r)+1$.

(3) Define ç as a segment of $c_i^k$ of length L(r) and starting at bit N of $c_i^k$. Then update H by $$H=\min(H,D(ç,r))$$

where D(a,b) is the Hamming distance between bit patterns a and b.

(4) Decrement N by 1 and go to step (3) if N is positive.

After repeating the foregoing steps (2)–(4) for each codeword in subspace $S_1$, H is the Hamming distance of r to $S_1$. and is denoted $H_1$. Of course, if H becomes 0, then r is not a possible resynchronization word and the searching may be terminated.

Continue with the second search over the subspace $S_2$:

(1) Initialize a variable H to be L(r); H will be the Hamming distance of r to the subspace $S_2$ at the end of the second search.

(2) The total number of shifts needed to find the Hamming distance between word r and two concatenated codewords $c_i^k+c_j^n$ in $S_2$ is $L(c_i^k)+L(c_j^n)-L(r)+1$, so initialize a shift counter $N=L(c_i^k)+L(c_j^n)-L(r)+1$.

(3) Define ç as a length L(r) segment of $c_i^k+c_j^n$ starting at bit N. Then update H by $$H=\min(H,D(ç,r))$$

(4) Decrement N by 1 and go to step (3) if N is positive.

After repeating the foregoing steps (2)–(4) for each ordered pair of codewords in subspace $S_2$, H is the Hamming distance of r to $S_2$ and is denoted $H_2$. Again, if H decreases to 0, then r is not a possible resynchronization word and the searching may be terminated.

Lastly, do the third search over subspace $S_3$. Define a coherent block as a chosen codeword $c_q^P$ from the VLC tables such that $L(c_q^P)$ is less than L(r). This is the center piece from which other codewords are concatenated to the left and right; see FIG. 3. For every coherent block in the VLC tables, proceed as:

(1) Initialize a variable H to be L(r); H will be the Hamming distance of r to the subspace $S_3$ at the end of the third search.

(2) The total number of shifts needed to find the Hamming distance between word r and a concatenation of three or more codeword with coherent block $c_q^P$ in $S_3$ is $L(r)-L(c_q^P)+1$, so initialize a shift counter $N=L(r)-L(c_q^P)+1$.

(3) Partition r into three (possibly empty) portions: $r_1$ is the first N−1 bits, $r_2$ is the next $L(c_q^P)$ bits, and $r_3$ is the remaining $L(r)-L(c_q^P)-N+1$ bits.

(4) Recursively concatenate allowable codewords on both ends of the coherent block and compute Hamming distance:

(a) form an allowed combination of codewords to the left of the coherent block until its length is at least N−1, and define $ç_1$ as the last N−1 bits of this combination.

(b) form an allowable combination of codewords to the right of the coherent block plus left combination from (a) until the right combination has length of at least $L(r)-L(c_q^P)-N+1$, and define $ç_3$ as the first $L(r)-L(c_q^P)-N+1$ bits of this right combination.

(c) update H by $$H=\min(H, D(ç_1,r_1)+D(c_q^P,r_2)+D(ç_3,r_3))$$

(d) repeat steps (a)–(c) for all allowable left and right combinations.

(5) Decrease N by 1 and go to step (3) if N is positive. After repeating the steps (2)–(5) for each coherent block in the VLC tables, H is the distance between r and $S_3$, and is denoted $H_3$.

Thus the Hamming distance between r and all possible bitstreams is $\min(H_1,H_2,H_3)$. So an optimal resynchronization word can be found (if one exists) by searching with increasing word length until a positive Hamming distance is found. Looking for a (longer) word with a Hamming distance to the bitstream of greater than 1 likely does not help due to the nature of burst errors. The searching method minimizes the search space by focusing in $S_3$ on the coherent block and not on short codewords which overlap the ends of the possible resynchronization word.

The searching strategy for finding a resynchronization word relies on a presumption that such a word exists for the given VLC tables. If the VLC tables form a set of prefix-free code tables with at Video Object Resynchronization Object-based video coding methods decompose video into moving objects plus a background object, so a sequence of frames is treated as a set of sequences of video object, one sequence for each object. Each frame is thus coded as a set of separately coded objects. A decoder reconstructs a frame from the decoded objects. This permits the objects to be coded at multiple resolutions, and the decoder may select certain objects to decode at higher resolution for better visual perception.

The shape, content (texture), and motion of the objects can be efficiently coded using motion compensation as previously described; and objects may be relatively small (within a few macroblocks), so avoid the first embodiment's slice() restriction to a single row of macroblocks. The preferred embodiment error concealment for this compressed data again partitions the shape, motion vector, and texture data and provides resynchronization words between each partition; this again is in contrast the known treatment of the shape, motion vector, and texture data on a macroblock basis. Thus introduce resynchronization words at the start of the data for an I frame and at the start of each of the codes for the following items for every detected object in a P frame in addition to the start of the P frame:

(I) shape (e.g., boundary contour data);

(ii) motion vector data; and (iii) texture data (DCT or other method compressed residual data such as wavelet). Further, if control data or other data is also included, then this data can also have resynchronization words. The resynchronization words The resynchronization words are characterized by the fact that they are unique, i.e., they are different from any given sequence of coded bits of the same length because they are not in the VLC table(s) which are static table(s). For example, if a P frame had three moving objects, then the sequence would look like:

frame begin resynchronization word contour (shape) resynchronization word first object's contour data motion vector resynchronization word first object's motion vector data;

texture resynchronization word first object's texture data contour (shape) resynchronization word
second object's contour data
motion vector resynchronization word
second object's motion vector data;
texture resynchronization word
second object's texture data
contour (shape) resynchronization word
third object's contour data
motion vector resynchronization word
third object's motion vector data;
texture resynchronization word
third object's texture data These resynchronization words also help the decoder detect errors.

Once the decoder detects an error in the received bitstream, it tries to find the nearest resynchronization word. Thus the decoder reestablishes synchronization at the earliest possible time with a minimal loss of coded data.

An error may be detected at the decoder if any of the following conditions is observed:

(I) an invalid codeword is found;

(ii) an invalid mode is detected while decoding;

(iii) the resynchronization word does not follow a decoded block of data;

(iv) a motion vector points outside of the frame;

(v) a decoded dct value lies outside of the permissible limits; or (vi) the boundary contour is invalid (lies outside of the image).

If an error is detected in the boundary contour data, then the contour is discarded and is made a part of the background; this means the corresponding region of the previous frame is used. This reduces some distortion because three often is temporal correlation in the video sequence.

If an error is detected in the motion vector data, then the average motion vector for the object is applied to the entire object rather than each macroblock using its own motion vector. This relies on the fact that there is large spatial correlation in a given frame; therefore, most of the motion vectors of a given object are approximately the same. Thus the average motion vector applied to the various macroblocks of the object will be a good approximation and help reduce visual distortion significantly.

If an error is detected in the texture data, then all of the texture data is set to zero and the decoder attempts to resynchronize.

Video Object Motion Resynchronization

An explicit example of the foregoing object data partitioning for resynchronization has been experimentally examined and shows enhanced performance with a small overhead in additional bits required for coding. In particular, just motion vector data and texture data were used for P type pictures, and FIG. 5 illustrates the bitstream. The motion vector data for each macroblock consists of two parts: the number of motion vectors and the actual motion vector(s). The number of motion vectors is either 0, 1, or 4, which corresponds to no motion compensation, a single motion vector for the entire macroblock, or a motion vector for each of the four 8 by 8 blocks making up the macroblock, respectively. The number of motion vectors is coded with the following VLC table:

| | |
|---|---|
| 0 | 11 |
| 1 | 0 |
| 4 | 10 |

The motion vectors are (differentially from preceding frame) encoded with the horizontal component, and each component is coded with the following VLC table where s equals 0 for a + entry and 1 for a − entry:

| | |
|---|---|
| ±16 | 0000 0000 0010s |
| ±15.5 | 0000 0000 0011s |
| ±15 | 0000 0000 010s |
| ±14.5 | 0000 0000 011s |
| ±14 | 0000 0000 100s |
| ±13.5 | 0000 0000 101s |
| ±13 | 0000 0000 110s |
| ±12.5 | 0000 0000 111s |
| ±12 | 0000 0001 00s |
| ±11.5 | 0000 0001 01s |
| ±11 | 0000 0001 10s |
| ±10.5 | 0000 0001 11s |
| ±10 | 0000 0010 00s |
| ±9.5 | 0000 0010 01s |
| ±9 | 0000 0010 10s |
| ±8.5 | 0000 0010 11s |
| ±8 | 0000 0011 00s |
| ±7.5 | 0000 0011 01s |
| ±7 | 0000 0011 10s |
| ±6.5 | 0000 0011 11s |
| ±6 | 0000 0100 00s |
| ±5.5 | 0000 0100 01s |
| ±5 | 0000 0100 1s |
| ±4.5 | 0000 0101 0s |
| ±4 | 0000 0101 1s |
| ±3.5 | 0000 011s |
| ±3 | 0000 100s |
| ±2.5 | 0000 101s |
| ±2 | 0000 11s |
| ±1.5 | 0001s |
| ±1 | 001s |
| ±0.5 | 01s |
| 0 | 1 |

Thus allowable bistreams will have either 2 or 8 consecutive entries from this VLC table depending upon the preceding entry from the foregoing number of vectors VLC table. The bitstream will have some fixed length codes for object items such as frame prediction type (e.g., I, P, or B) and quantization factor for the texture data, and a 17-bit resynchronization marker 0000 0000 0000 0000 1 following the texture data for packetizing the macroblock data, and a search using the preferred embodiment method of the preceding section with these two VLC tables for the motion vector data and resynchronization marker yielded roughly 10 possible minimal length (17 bits) motion resynchronization words. A particular motion resynchronization word (1010 0000 0000 0000 1) was selected and used in simulations of transmission over a noisy channel by corrupting a bitstream with random bit errors, packet loss errors, and burst errors. FIG. 4 shows the performance of the error resilient bitstream (partitioning motion vector data and texture data with the motion resynchronization word between) as compared to the usual motion vectors and texture data in a macroblock by macroblock sequence. For the simulation the bit error rate was $10^{-2}$ and the burst length was 1 ms. FIG. 4 shows the peak signal to noise ratio (PSNR) as a function of frame number. The partitioning of the motion vector and texture data with a motion resynchronization word yielded more than a 2 dB gain.

Video Object Shape and Motion Resynchronization

For a bitstream including shape data, motion vector data, and texture data for multiple objects, a preferred embodiment coding has packets with resynchronization markers separating the data of the objects. Between each pair of resynchronization markers the data for a set of macroblocks of a single object is partitioned into shape data, motion vector data, and texture data with a shape resynchronization word between the shape data and the motion vector data and a motion resynchronization word between the motion vector data and the texture data; see FIG. 5. The motion vector data again includes the number of motion vectors plus differential motion vector components; the shape data includes the object identification data and shape codes The size of the objects (number of macroblocks) may vary greatly, so a single packet may contain, for example, a final portion of the macroblocks of a first object, all of the macroblocks of a second objects, and an initial portion of the macroblocks of a third object. In this case, the resynchronization markers would separate the three objects' data sets and the shape and motion resynchronization words would be the boundaries for the partitioning of the data for each object into shape, motion, and texture data.

In an alternate scenario, it may be preferable to packetize each individual object separately. In this case the shape, motion and texture data of the only one object occurs between two consecutive resync markers. See FIG. 6 showing scans through macroblocks of two objects in a frame, and FIG. 7 showing the bitstream syntax. In this scheme also between two resync markers the shape and motion may occur. The advantage of this approach that the data belonging to each object is separately packetized in the bitstream.

Generally, a resynchronization marker may be inserted at fixed intervals in the bitstream, so an object's data may be split into more than one shape-motion-texture grouping. For example, a low bit rate such as 48 kbps and high compression, a resynchronization marker maya be used every 764 bits. At higher rates, use less frequent resynchronization markers.

The shape resynchronization word and the motion resynchronization word can each be generated by the preferred embodiment search method. As previously described, the resynchronization words help error detection and provide partial data use even if some of the data must be discarded; for example, shape data and motion vector data may be used without the texture data.

One possibility for improved error resilience uses reversible codes (codeword are symmetric) in the VLC tables with the shape and motion resynchronization words. This has the advantage localizing a detected error: once a decoder detects an error, the decoder may jump to the next resynchronization marker and decode backwards towards the previously detected error. Because the use of VLC often makes an error detectable only after its location has been passed by the decoder, the backwards decoding likely will not detect an error until passing the location of the forward error detection; see FIG. ?. In this case, discard the data between the locations of the forward decoded and the backwards detected errors. This provides the maximum amount of data recovery from the error.

What is claimed is:

1. A method of generating a word unique from a variable length code set, comprising the steps of:

(a) providing a set of variable length code words;

(b) for a positive integer R, partitioning the space of all bit patterns of length R which could arise within a sequence of said code words into first, second, and third subspaces: said first subspace being all length R sequences within code words of length at least R, said second subspace being all length R sequences within an allowable concatenation of two of said code words with the sum of lengths at least R, said third subspace being all length R sequences within an allowable concatenation of three or more of said code words with the sum of the lengths at least R and with the length of the interior code word(s) of said three or more code words of length less than R, (c) provide a potential resynchronization word of length N;

(d) computing the distance from said potential resynchronization word to said first subspace;

(e) when said distance of said potential resynchronization word to said first subspace is greater than 0, computing the distance from said potential resynchronization word to said second subspace;

(f) when said distance of said potential resynchronization word to said second subspace is greater than 0, computing the distance from said potential resynchronization word to said third subspace;

(g) when said distance of said potential resynchronization word to said third subspace is greater than 0, selecting said potential resynchronization word as a resynchronization word;

(h) when said distance to said first, second, or third subspace is 0, providing another potential resynchronization word of length N and repeating foregoing steps beginning at step (c);

(i) when said distance to said first, second, or third subspace is 0 for all potential resynchronization words of length N, replacing N with N+1 and repeating foregoing steps beginning at step (c).

* * * * *